Figure 1:
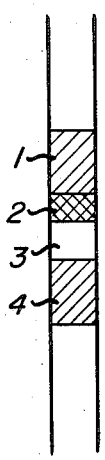
Figure 2:
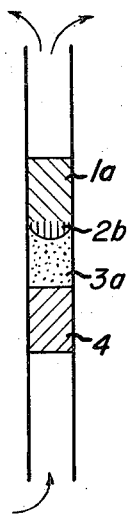

United States Patent [19]

Novak et al.

[11] 3,787,184

[45] Jan. 22, 1974

[54] METHOD AND COMPOSITION FOR DETECTING AMINE COMPOUNDS

[75] Inventors: Thaddeus J. Novak; Edward J. Poziomek, both of Bel Air, Md.

[73] Assignee: The United States of America as represented by the Secretary of the Army, Washington, D.C.

[22] Filed: Mar. 23, 1970

[21] Appl. No.: 24,918

[52] U.S. Cl. .............................. 23/230 R, 252/408
[51] Int. Cl. ............................................ G01n 31/00
[58] Field of Search ....... 252/408; 23/230, 232, 254

[56] References Cited
UNITED STATES PATENTS

| | | | |
|---|---|---|---|
| 3,025,142 | 3/1962 | Williams | 252/408 G |
| 3,131,030 | 4/1964 | Grosskupf | 252/408 |
| 3,528,780 | 9/1970 | Radawski | 252/408 |
| 3,533,750 | 10/1970 | Belisle | 23/232 |
| 3,567,382 | 3/1971 | Crabtree et al. | 23/232 |

FOREIGN PATENTS OR APPLICATIONS

| | | | |
|---|---|---|---|
| 270,540 | 5/1963 | Australia | 252/408 |
| 662,170 | 4/1963 | Canada | 252/408 |

*Primary Examiner*—Benjamin R. Padgett
*Assistant Examiner*—R. L. Tate
*Attorney, Agent, or Firm*—Edward J. Kelly; Herbert Berl

[57] ABSTRACT

A method for detecting nitrogen containing compounds the steps comprising contacting a sample comprising said compounds with a signalling composition containing a capped copolymer and dye and producing a visible detecting signal.

7 Claims, 2 Drawing Figures

PATENTED JAN 22 1974 3,787,184

INVENTORS
Thaddeus J. Novak
Edward J. Poziomek

BY Harry M. Saragovitz
Edward J. Kelly
Herbert Berl
Jacob Ziegler (AGT.)
ATTORNEYS

METHOD AND COMPOSITION FOR DETECTING AMINE COMPOUNDS

DEDICATORY CLAUSE

The invention described herein may be manufactured, used, and licensed by or for the Government for governmental purposes without the payment to us of any royalty thereon.

The present invention describes the detection of various nitrogen containing compounds causing the decomposition of the capped copolymer affecting the dissolution of the dye pinacyanole giving rise to the detecting signal.

It is the object of this invention to employ the use of a copolymer to detect various nitrogen containing compounds over a broad concentration range.

A detecting tube comprising a signalling composition contacting a sample comprising at least $0.4\gamma$ of nitrogen containing compounds, for example, aliphatic amines, alicyclic amines, aqueous ammonia, alchol substituted amines, arylamines, alkoxy alkyl substituted amines, heterocyclics or organophosphorus amines, resulting in uncapping the copolymer which disperses the dye producing a blue detecting signal indicating the presence of the nitrogen containing compounds. In general, when the concentration of the compound is sufficiently high upon contacting the signalling composition, for example, at least $150\gamma$ as a vapor or at least $30\gamma$ in a solution, a visible blue detecting signal is produced within five minutes at room temperature. However, when the concentration of the compound contacting aforesaid composition is below $150\gamma$ as a vapor or below $30\gamma$ in a solution, the signalling composition and its contents are heated at 110°C for about 5 minutes to produce the visible detecting signal. The detection sensitivity can be increased by pretreating the detecting tube comprising the signalling composition passing about 175cc of air saturated with water vapor and then contacting the detecting tube with the nitrogen containing compound.

Dale D. Williams, U.S. Pat. No. 3,025,142, describes the method of detecting amine vapors on silica gel impregnated with a solution of triketohydrindene hydrate, then heating to 95° to 100°C for 2 minutes and subsequent cooling to room temperature producing a blue color.

The utility of the various nitrogen containing compounds is well established in the literature, for example, diethylamine is utilized in various industries of rubber, petroleum, dye and pharmaceuticals, ethanolamine is employed to remove $CO_2$ and $H_2S$ from natural gas and in the synthesis of surface active agents, pyridine is toxic to humans by causing central nervous system depression and irritation of the skin and respiratory tract. Accordingly, our detecting system can be used to monitor the presence of these compounds in multiple industrial applications and to avoid harm to humans.

The amount of amine drawn through the detecting tube was based upon the assumption that the system comprising the nitrogen containing compound was ideal and therefore behaved according to Rauolt's law ($P=P°N$) and then determining the amount of the compound by substituting the value for P into the ideal gas equation of $PV=nRT$ to obtain the number of moles of the compound.

The copolymer prepared from the polymerization of chloral and dichloroacetaldehyde employed in the invention is described by G. H. McCain et al, "Copolymerization of Chloral and Dichloroacetaldehyde Catalyzed by Organometallic Compounds." J. Polymer Sci. A-1, 5, 975–986 (1967).

The following method was employed to prepare the acetate copolymer. A flask, fitted with thermometer, drying tube and magnetic stirring bar, containing a mixture comprising about 113 g of acetyl chloride is cooled to 4°C in an ice bath, then adding 10.0g chloral-dichloroacetaldehyde copolymer and stirring said mixture at 4°–5°C for one hour. The mixture was permitted to reach room temperature with additional stirring for 2 hours. The flask and its contents were again cooled to 4°C and 50 ml of methanol was added over a 2 hour interval, and an additional 100 ml of methanol was quickly added followed with additional stirring for 15 minutes. The mixture was filtered and the solid was washed with 50 ml of methanol and then air dried by permitting air to pass through the funnel producing a colorless solid of about 9.0 grams of the acetate capped copolymer of chloral-dichloroacetaldehyde.

The tetrahydropyranyl capped copolymer was prepared in accordance to the following method. A flask, fitted with thermometer, drying tube and magnetic stirring bar, containing a mixture comprising 10 ml 3,4 dihydropyran and one drop of concentrated sulfuric acid was cooled to 10°C in an ice bath then adding 1.11g of chloral-dichloroacetaldehyde copolymer and stirring mixture at 10°–15°C for 30 minutes. The mixture is permitted to reach room temperature while the stirring is continued for an additional 30 minutes and then filtered under vacuum overnight. During the filtration step, the funnel is covered with a rubber film yielding 0.48g of a tan solid of the tetrahydropyranyl capped copolymer of chloral-dichloroacetaldehyde.

FIG. I describes the detector tube prior to exposure to the vaporized agent. FIG. II, similar to FIG. I, illustrates the color developed after exposure to the vaporized agent.

In FIG. I, 1 and 4 are the organdy cloth plugs (white), 2 dry pinacyanole dye (green) and 3 capped copolymer (white).

In FIG. II the curve arrows describe the entrance of the vaporized agent through 4 organdy cloth plugs (white) contacting the $3^a$ capped polymer which is decomposing to chloroacetaldehyde liquid (transparent blue,) $2^a$ is the decomposing capped copolymer (blue) intermixing with the dye, $1^a$ organdy cloth plug (dark blue) and the exit through the top of the glass tube of the nontrapped vaporized material.

The detecting tube is a glass tube (2.5 mm inside diameter) containing a signalling composition held in place with two organdy cloth plugs. Said composition comprising a compact band of about 1–5 mg of dry pinacyanole contiguous with a compact band of about 8–12 mg of capped chloral-dichloroacetaldehyde copolymer.

The method of preparing the toxic compound O-ethyl S-diethylaminoethyl methylphosphonothiolate was the result of classified research and does not form the inventive portion of this invention.

EXAMPLE 1

The method of producing O-ethyl S-diethylaminoethyl methylphosphonothiolate the steps comprising to a 50.0 ml of 0.4 M sodium hydroxide solution was added to 100 ml aqueous solution containing 9.17 g (0.04 moles) potassium ethyl methylphosphonothiolate, and then adding 200 ml of an aqueous solution containing 3.44 g (0.02 moles) of beta-chloroethyl diethylamine hydrochloride. The solutions were mixed and allowed to stand for five minutes. The pH of the solution was between 10.0 and 10.5. After 5 minutes, 50 ml of 0.04 M acetic acid was added. The pH dropped to 5.15. The solution pH was adjusted and maintained at 10.5 and extracted with diethyl ether. The extract was dried over anhydrous sodium sulfate and distilled yielding O-ethyl S-diethylaminoethyl methylphosphonothiolate.

EXAMPLE 2

The detector tube comprising a capped polymer and pinacyanole was treated with at least 2.7γ of O-ethyl S-diethylaminoethyl methylphosphonothiolate via an aerosol generator contacting the signalling composition. At room temperature no positive test was produced, however when the detecting tube was heated at 110°C for five minutes a positive test resulted.

There are several general methods of contacting nitrogen containing compounds with the signalling composition. Methods A and B utilize the vapor state contact of the compound for detecting, and Method C employs a solution of the compound for contacting the signal composition.

Method A is a closed system. The detecting tube and thermometer fitting into a flask containing a solution comprising a nitrogen compound stirring for about 15 minutes with the impregnation of the vapors from the nitrogen compound upon the signalling composition by means of a rubber aspirator bulb. The tube and its contents are removed and heated at about 110°C for approximately 5 minutes producing a blue detecting signal indicating the presence of below 150γ of nitrogen compound. The tube and its contents at room temperature, that is, without the heating steps, will give a blue detecting signal when there is at least 150γ of nitrogen compound. This is a convenient tool to estimate the relative concentration of the nitrogen compound with the heating and nonheating steps.

Method B is an open system. The detecting tube was placed in the apparatus described by Crabtree et al. in Talanta, 14, 857 (1967). The compound enters the side arm air inlet passing into the test tube with the vapors being drawn through the detector tube. As experienced in Method A, concentrations of below 150γ of the compound requires the tube heating step at 110°C for 5 minutes while compound concentration of at least 150γ do not require the heating step but give a detecting signal at room temperature.

In Method C, a hypodermic syringe containing a solution comprising the unknown nitrogen compound was injected in the detector tube at the interface of the pinacyanole and the capped polymer giving rise to a blue color indicating the presence of the nitrogen containing compound. The tube and its contents are heated at 110°C for about 5 minutes when the compound concentration is below 30γ while at compound concentration at least 30γ do not require the heating step.

The proportion of the diethylamine detected based on either Method A or B is substantially the same as shown in Example 4(*a*) and (*b*) where the amine under said A is about 8γ while under said B is about 7γ upon heating within the same time frame.

The results of our selectivity testing, Table I for the polymer detecting system of this invention appears to indicate that detection depends upon the totality of several properties of the amine including vapor pressure, basicity and steric hindrance. As a general effect the compounds which are most basic and most volatile may give a more rapid response. One property may outweigh another property and give a detecting signal a little sooner in time or at a slightly different concentration, for example, diethylamine will give the blue signal at room temperature in about one minute as compared with triethylamine giving the blue signal within 5 minutes at room temperature. The triethylamine is more bulky sterically than the diethylamine. The data also indicate that as the vapor pressures approach unity and the ionization constant decreases from unity the addition of petroleum ether to the polymer is required to give a positive test with heating.

Table 1

A Comparison of Amine Properties with the Detection System for a Positive Test

| Compound | Vapor Pressure mm Hg (°C) | Detecting System | $K_{(b)}aq$ |
|---|---|---|---|
| n-Butylamine | 103 (32.2) | A | $4.1 \times 10^{-4}$ |
| iso-Butylamine | 199 (32.2) | A | $3.1 \times 10^{-4}$ |
| sec-Butylamine | 287.5 (32.2) | A | $3.6 \times 10_{+}^{4}$ |
| Diethylamine | 316 (32.2) | A | $9.6 \times 10^{-4}$ |
| Piperidine | 40 (29.2) | A | $1.6 \times 10^{-3}$ |
| Triethylamine | 468 (29.0) | A | $5.7 \times 10^{-4}$ |
| Benzylamine | 1 (29.0) | B | $2.4 \times 10^{-5}$ |
| N,N Dimethylaniline | 1 (29.5) | B | $1.2 \times 10^{-9}$ |
| 2-Picoline | 10 (24.4) | B | $3 \times 10^{-8}$ |
| Pyridine | 40 (38.0) | B | $1.7 \times 10^{-9}$ |
| Quinoline | 1 (59.7 ) | B | $6.3 \times 10^{-10}$ |

A — blue signal upon contact of vapor within five minutes at room temperature.
B — blue signal, upon contact with vapor and then wetting polymer with petroleum ether (30 ° – 60°C), ligroin, within five minutes at room temperature.
$K_{(b)}aq$ — ionization constant in aqueous solution The detecting tube impregnated with the vapors of the listed compounds at a concentration of at least 150γ requires no heating to give the blue detecting signal while less than 150γ requires heating for about 5 minutes at 110°C for the blue signal. A solution comprising petroleum ether, 30° – 60°C, and the compounds at concentration at about 1γ injected at the interface of the dye and capped copolymer produces a blue detecting signal at room temperature. The compounds are ammonium hydroxide, allylamine, n-butylamine, isobutylamine, sec-butylamine, cyclohexylamine, diethylamine, dibutylamine, dipropylamine, piperidine diallylamine, 2-ethylhexylamine, hexylamine, triallylamine, tributylamine and triethylamine.

The detecting tube impregnated with the vapors of the following compounds also requires that the capped polymer be moistened with petroleum ether and then heated at 110°C for about 5 minutes in order to give the blue signal. A solution comprising the listed compounds at concentration at least 30γ injected at the interface of the dye and capped polymer give a detecting signal at room temperature while concentration below 30γ of the compounds requires heating the tube and contents to produce a blue detecting signal. The compounds are N,N-dimethylformamide, N,N-dimethyldodecylamine, 1-amino-2-propanol, 1-dimethylamino-2-propanol, ethanolamine, 2-ethylamino ethanol, 3-methoxypropylamine, N-methylmorpholine, benzylamine, dibenzylamine, o- aminobenzenethiol, 2-dibutylaminoethanol, diethanolamine, 2-dimethylaminoethanol, 2-diethylaminoethanol, 2-methylaminoethanol, N-ethylmorpholine, morpholine, 3,3¹-diaminodipropylamine, diethylenetriamine, N,N-diethylenediamine, N,N-diethyl-1, 3-propanediamine, N,N-dimethyl, 1,3-propanediamine, ethylenediamine, 1,2-propanediamine 90%, N,N-dimethylaniline, 2,4-dimethyl aniline, 2,4-lutidine, 2,6-lutidine, 2-pico-line, 3-picoline, 4-picoline, pyridine, quinoline, 2,4,6-trimethyl pyridine.

EXAMPLE 3 a. According to Method B, described above, a solution containing at least 150γ of diallylamine, pyridine, cyclohexylamine or diethylamine was in the test tube with the vapors drawn through the detecting tube comprising a signalling composition. The blue detecting signal was visible at room temperature within a time period of 1 to 5 minutes.

b. The method according to Method B, a solution comprising less than 150γ of diallylamine, pyridine, cyclohexylamine or diethylamine was in the test tube with the vapors drawn through the detecting tube comprising a signalling composition. No visible blue signal at room temperature. The detecting tube and its contents were heated at 110°C for about 5 minutes with the production of the blue color.

EXAMPLE 4 a. In accordance with Method A, supra, a solution comprising about 8γ of vaporizable diethylamine or 8γ of triethylamine was stirred and subsequently collected in the detecting tube which was subsequently removed and heated at 110°C for about 5 minutes giving rise to a blue detecting signal.

b. In accordance with Procedure B, supra, air comprising about 7γ of vaporized diethylamine or 7γ of triethylamine was drawn into the apparatus and then impregnating the detecting mixture in the detecting tube. The tube and its contents were subsequently heated at 110°C for about 5 minutes producing the blue detecting signal.

c. The procedure in accordance with (b), supra, was repeated with the exception of utilizing an air sample comprising about 4γ of the diethylamine or 4γ of triethylamine giving rise to a blue detecting signal.

d. The procedure in (c), supra, was repeated with the utilization of an air sample containing about 2γ of diethylamine or 2γ triethylamine but upon heating the detecting tube there was no blue color detecting signal, thus a negative test.

e. The procedure and proportion of the amine in accordance with (d), supra, was repeated with the exception of pretreating the detecting tube by drawing through the tube about 175 cc of air saturated with water vapor prior to exposure to the vaporized diethylamine or triethylamine. A blue detecting signal was obtained at this 2γ concentration.

f. The procedure and detecting tube pretreatment in accordance with (e), supra, was followed with the exception of utilizing about 1γ of vaporized diethylamine or 1γ of triethylamine for the corresponding 2γ amines. There was no blue detecting signal upon heating the tube.

EXAMPLE 5 a. According to Method C, at room temperature a hypodermic syringe containing a solution comprising 1.0 to 10γ of triethylamine or dimethylamine in 10γl of petroleum ether (b.p. 30°–60°C) was injected at the interface of the dye, pinacyanole and the capped polymer in the detecting tube without the aid of heating the tube the blue detecting signal developing between 60 seconds at the 1.0 concentration and immediate color upon injection at 10γ level with the approximate corresponding intermediate times for intermediate concentrations.

b. In accordance with (a), supra, with the exception of injecting 30γ of triethylamine below the interface of the dye and capped polymer giving a negative test. Upon subsequent heating at 110°C for 5 minutes also gave a negative test.

c. The procedure in accordance with (a), supra, was repeated utilizing at least 0.4γ to 0.7γ of diethylamine or triethylamine gave no blue detecting signal at room temperature. However, upon heating at 110°C for 5 minutes the tube containing the diethylamine a blue color developed while the tube containing the triethylamine did not give use to a blue signal.

EXAMPLE 6 a. The vapors of a sample comprising at least 140γ of benzylamine, quinoline, pyridine or N,N-dimethylaniline was drawn through the detecting tube comprising a detecting mixture with subsequent heating at 110°C for 5 minutes without producing the blue detecting signal. The polymer in the detecting mixture was moistened with petroleum ether and heating step at 110°C was repeated with production of the blue signal within 5 minutes.

We claim:

1. A method for detecting a fluid amine compound, the steps comprising contacting the fluid compound of an aliphatic amine, alicyclic amine, ammonia, alcohol substituted amine, arylamine, alkoxy alkyl substituted amine, heterocyclic amine or organophosphorus amine with a signalling composition confined in a container, said composition comprising pinacyanole and a copolymer of an acetate capped chloral-dichloroacetaldehyde or tetrahydropyranyl capped chloral-dichloroacetaldehyde, thereby decomposing the copolymer and intermixing with the pinacyanole, and producing a blue detecting signal within said container.

2. The method according to claim 1 including the steps of heating the container and said signalling composition, subsequent to said step of contacting, to approximately 110°C for five minutes thereby producing a visible detecting signal.

3. The method according to claim 1, including the steps of treating the signalling composition with air saturated with water vapor prior to contacting the amine compound.

4. The method according to claim 1, wherein the amine compound contact the interface of pinacyanole and capped copolymer.

5. The method according to claim 1, wherein the amine compound is diethanolamine, benzylamine, 3-methoxypropylamine, diethylamine, pyridine or O-ethyl-S-diethylaminoethyl methylphosphonothiolate.

6. The method according to claim 1, wherein the capped copolymer is moistened with petroleum ether b.p. 30°–60°C.

7. A composition comprising pinacyanole, a copolymer of an acetate capped chloral-dichloroacetaldehyde or tetrahydropyranyl capped chloral-dichloroacetaldehyde for detecting a fluid amine compound of an aliphatic amine, alicyclic amine, ammonia, alcohol substituted amine, arylamine, alkoxy alkyl substituted amine, heterocyclic amine or organophosphorus amine.

* * * * *